United States Patent [19]

Sasaki et al.

[11] Patent Number: 4,782,497
[45] Date of Patent: Nov. 1, 1988

[54] ELECTRIC MELTING FURNACE FOR GLASSIFYING HIGH-RADIOACTIVE WASTE

[75] Inventors: Noriaki Sasaki; Hiroshi Igarashi; Noboru Endo, all of Ibaragi; Katsumi Inada, Kusatsu; Toshio Nakamura, Otsu; Hirokazu Takeuchi, Kusatsu, all of Japan

[73] Assignees: Doryoku Kaunenryo Kaihatsu Jigyodan, Tokyo; Nippon Denki Garasu Kabushiki Kaisha, Shiga, both of Japan

[21] Appl. No.: 938,183

[22] Filed: Dec. 5, 1986

[30] Foreign Application Priority Data

Dec. 6, 1985 [JP] Japan .................................. 60-275595

[51] Int. Cl.$^4$ ............................................. C03B 5/027
[52] U.S. Cl. ........................................ 373/29; 373/30; 373/33; 373/41
[58] Field of Search ....................... 373/29, 30, 33, 35, 373/41; 252/626, 629, 633

[56] References Cited

U.S. PATENT DOCUMENTS 4,624,003 11/1986 Eirich .................................... 373/41

Primary Examiner—Roy N. Envall, Jr.
Attorney, Agent, or Firm—Armstrong, Nikaido, Marmelstein & Kubovcik

[57] ABSTRACT

An electric melting furnace for glassifying high-radioactive waste characterized in that, in a furnace for melting glass containing platinum-group elements which has an outlet of glass at the bottom part of a melting tank, the bottom of the furnace surrounding the outlet has an inclination of more than 30° and not more than 70° with respect to the horizontal plane toward the cullet, and the distance $l_1$ between a surface-inside opening part of the outlet and bottom ends of at least a pair of electrodes (3a, 3b) for supplying most of power required for glass melting is a half or more, but not exceeding, of the distance ($l_2$) between the electrodes (3a, 3b).

6 Claims, 2 Drawing Sheets

ELECTRIC MELTING FURNACE FOR GLASSIFYING HIGH-RADIOACTIVE WASTE

BACKGROUND OF THE INVENTION

The present invention relates to an electric melting furnace for glassifying high-radioactive waste having been produced in a reprocessing plant.

The high-radioactive waste having been produced in the reprocessing plant is normally liquid and has an extremely high radioactivity. It is for this reason that for safely isolating highly radioactive waste from the human environment over a long period, the processing technic had to be developed wherein the waste and glass-making materials are melted into glass at high temperature, and poured into a canister as a container for solidification.

This means that the high-radioactive waste undergoes a suitable pre-treatment, and is first fed to an electric melting furnace (hereinafter referred to as melter) normally in liquid state together with glass material. Thus, in the melter, the high-radioactive waste becomes a high-temperature molten-glass together with the glass material. This molten-glass is put into a metal container called canister in a continuous or intermittent fashion. When filled with glass, the canister is sealed up, stored temporarily in storage facilities, and is scheduled to be finally buried into a deep geological formation for permanent disposal.

The high-radioactive waste and the glass material which are fed continuously to the melter (hereinafter referred to simply as material including both of them) are put in a state of covering the surface of the molten-glass in a melting tank made of bricks, and the evaporation of water in the waste, calcining glassifying reaction take place continuously by the transfer of heat from the molten-glass, and they are mixed with the existing molten-glass, becoming a homogeneous glass. Energy required to keep the molten-glass at high temperature is supplied by carrying a current across at least a pair of electrodes facing each other disposed in the molten-glass to Joule-heat the molten-glass existing inbetween.

For the protection of the operator from exposure, the melter is installed in a space called cell, and the operation, maintenance and exchange thereof are carried out by the remote manipulation. For this reason, the melter is so designed as to be smaller in size and light in weight whenever possible, and in the conventional melter for developing the technique of glassifying the high-radioactive waste, the inner capacity of the melting tank is so designed as to be also smaller whenever possible. This means that the depth of the melting tank is set at a minimum capable of disposing the above-described electrodes, and the bottom surface of the melting tank is designed to be nearly horizontal so that the inner capacity of the melting tank becomes small.

The high-radioactive waste contains the platinum-group elements such as Ru, Pd and Rh. These elements are hard to melt into glass and have large specific gravities, and therefore precipitate and accumulate on the bottom of the melting tank. Among these platinum-group elements, Pd and Rh are reduced and exist as metals in the glass, and Ru exists as metals or $RuO_2$ crystal.

$RuO_2$ is an oxide, but is a good electrical conductor, and reduced metals of Ru, Pd and Rh are, needless to say, good electrical conductors, and when such substances accumulate on the bottom of the furnace at high concentrations, the high-temperature inherent resistance value of the glass in the vicinity of the furnace bottom becomes smaller in comparison with that of the glass at the upper part (hereinafter the glass in the vicinity of the furnace bottom containing the platinum-group elements at high concentrations is referred to hereafter as furnace-bottom accumulation).

When the platinum-group elements accumulate on the bottom of the furnace, forming a good electrical conductor, in the conventional melter designed to have a shallow melting tank, a current flowing across the electrodes concentrates on the bottom of the furnace, and the temperature of the bottom of the furnace rises extraordinarily, and in reverse, the temperature of the glass at the surface of the melting tank falls and the ability of melting material is reduced. Also, since the surface of the bottom of the melting tank is nearly horizontal, the platinum-group elements accumulating on the bottom of the furnace do not flow even when the glass is made to flow down into the canister, and increasingly accumulate on the bottom of the furnace, and eventually no operation can be continued.

In order to stably glassify the high-radioactive waste containing the platinum-group elements in the melter of Joule-heating system, it is considered that the melter is required to provide the following two functions.

a. The platinum-group elements are hard to melt into glass, and the specific gravities thereof are about 10, while the specific gravities of the normal liquids of molten-glass is about 2.5 or more, and therefore they precipitate quickly in the liquid molten-glass, accumulating on the bottom of the furnace. The glass containing the platinum-group elements at high concentrations, that is, the furnace-bottom accumulation has a high-temperature inherent electric resistance value lower than that of the glass at the upper part thereof, and therefore when glass-melting of the high-radioactive waste is started, a good electrical conductor layer is formed on the bottom of the furnace in a short time.

Accordingly, the melter for glassifying the high-radioactive waste is required to be able to continue operation without trouble even when a good electrical conductor layer exists to some extent on the bottom of the furnace, that is, it is required to have a structure wherein the current flowing across electrodes does not concentrate selectively on the bottom of the furnace.

b. In the preceding paragraph, description is made on the necessity of a melter design having an electrodes arrangement capable of continuing operation even if a good conductive layer exists to some extent on the bottom of the furnace, but when the glass is poured into the canister, if only the furnace-bottom accumulation remains and continues to accumulate in the melting tank, naturally heating by means of carrying a current across electrodes is hindered.

Accordingly, a melter design is required wherein the bottom of the furnace has an inclination enough to remove the furnace-bottom accumulation by discharging it regularly or irregularly through an outlet.

SUMMARY OF THE INVENTION

In accordance with the present invention, in a melting furnace having an outlet for discharging glass at the bottom part of a melting tank, the bottom of the furnace surrounding the outlet has an inclination of more than 30° and not more than 70° with respect to the horizontal plane toward the outlet, and the distance between a furnace-inside opening part and the bottom ends of at least a pair of electrodes for supplying most of power required for glass melting is set at more than a half of the distance between the above-mentioned electrodes, and thereby the platinum-group elements can be removed and concentration of the current on the bottom of the furnace can be prevented, and thereby the electric melting furnace for glassifying the high-radioactive waste can be put in practical use.

If the distance between the bottom of the furnace and the electrodes is small, a good electrically conductive layer containing the platinum-group elements at high concentrations is formed on the bottom of the furnace, and the current across the electrodes concentrates on the bottom of the furnace, resulting in a trouble in operation of the melter. To prevent this, the distance between the bottom ends of the electrodes and the upper surface of the furnace bottom has only to be set at more than a half of the distance between the electrodes. This means that the distance between the bottom ends of the electrodes and the bottom of the furnace has only to be set at more than a sum of a half of the distance between the electrodes and the thickness of accumulation layer. The thickness of the accumulation layer is expected to differ naturally depending upon the kind of waste, method and frequency of drawing-out of the accumulation or the like, and it is reasonably presumed to be about 50–100 mm. On the other hand, when the distance between the bottom ends of the electrodes and the upper surface of the furnace bottom is made larger than the distance between the electrodes, the melting tank becomes deep and the inner capacity becomes larger than required, and thereby this not only goes against the request for smaller size and lighter weight, but also reduces the melting ability. The distance between the bottom ends of the electrodes and the furnace bottom should be smaller than or equal to the distance between the electrodes.

In order to remove the furnace-bottom accumulation containing the platinum-group elements at high concentrations, a freeze valve is installed at the bottom of the furnace, and the furnace-bottom refractory is required to have an inclination required for moving the accumulation with respect to the horizontal plane toward the freeze valve, and the glass is required to be drawn out regularly or irregularly through the freeze valve.

The magnitude of inclination required for moving the accumulation differs naturally depending upon the kind of waste or the like, and 30° is not enough, but if the inclination is greater than 70°, the melting tank becomes deep, thereby going against the purpose of smaller size and lighter weight, and also problems such as an excessively low temperature of the bottom of the furnace and the like might be raised, and therefore an inclination of more than 30° and not more than 70°, and desirably more than 40° and not more than 60° is considered to be suitable.

Thus, the purpose of the present invention is to provide a suitable melter design wherein no current concentrates on the bottom of the furnace even when the platinum-group elements accumulate on the bottom of the furnace and the accumulated platinum-group elements can be removed by drawing out the glass regularly or irregularly through the glass outlet at the bottom of the furnace.

DESCRIPTION OF THE PREFERRED EMBODIMENTS

Figure 1:
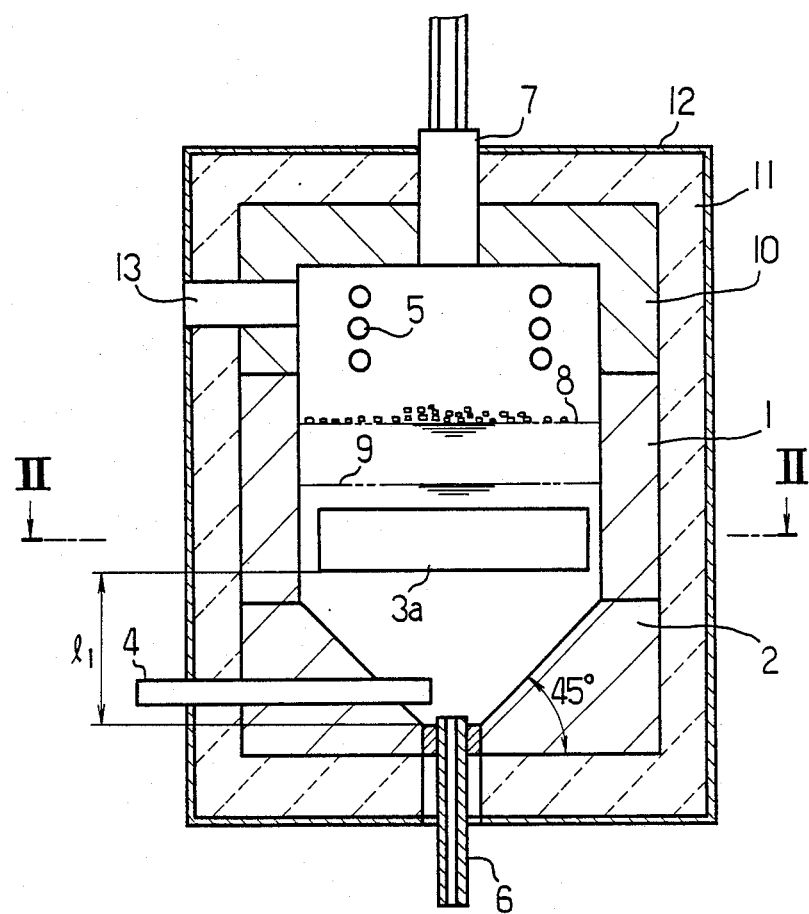
FIG. 1 is a cross-sectional elevation view of an electric melting furnace in accordance with the present invention.
Figure 2:
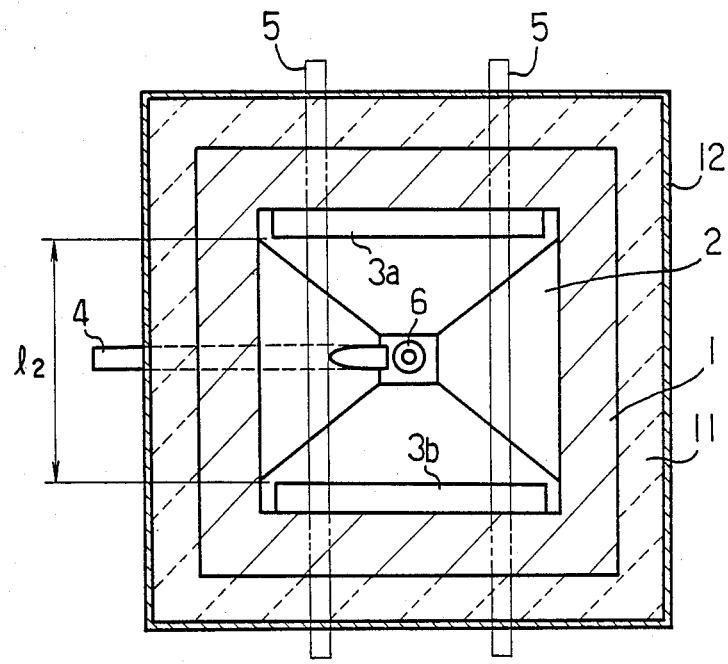
FIG. 2 is a cross-sectional view taken along line II—II in FIG. 1.

Description is made on FIG. 1 and FIG. 2 showing embodiments in accordance with the present invention. Numeral 1 designates a refractory forming side walls of a melting tank, and normally fused-cast bricks excelling in anticorrosion against molten-glass are used. Numeral 2 designates a furnace-bottom refractory installed surrounding a metal freeze valve 6 attached to a glass outlet at the bottom part of the melting tank, and likewise the numeral 1, the fused-cast bricks are normally used. This furnace-bottom refractory 2 has an inclination of 45° with respect to the horizontal plane toward the freeze valve 6. The freeze valve 6 is installed to discharge glass or stop discharge of glass, being heated by carrying a current through a metal cylinder or the like. Numerals 3a and 3b designate a pair of electrodes facing each other for supplying energy required for keeping the temperature of molten-glass at a value suitable for melting material, and they are disposed at a height such that a distance $l_1$ between the bottom ends of the electrodes and the bottom of the furnace is more than a half of and not more than a distance $l_2$ between the electrodes. For example, $l_1$ is set at 395 mm, and $l_2$ at 620 mm.

Numeral 4 designates an auxiliary electrode for adjusting the temperature of the glass at the upper part of the freeze valve, and a current is carried between either of the main electrodes and it. Numeral 10 designates a refractory at the top part of the melting tank for forming a top space of the melting tank, and numeral 11 designates an adiabatic refractory for improving the warmth-keeping property of a melter. Numeral 12 designates a metal casing, which is installed to prevent radioactive substance from leaking outside the melter. Numeral 5 designates a resistance heater for heating up the melter at start-up. Numeral 7 designates a material feed nozzle for feeding the melter with high-radioactive waste and glass material, and numeral 13 designates an off-gas tube for leading off-gas produced in melting material to an off-gas treating apparatus.

When starting operation, first, glass cullet is fed to the extent that the paired electrodes 3a and 3b are hidden, and thereafter power is supplied to the resistance heater 5 to gradually raise the temperature of the top space of the melting tank. When this temperature is raised to about 1000° C., vicinity of the surface of the glass cullet in the melting tank is molten. Glass is an electric insulator at low temperatures, but conducts a current when put in the molten state by rise in temperature. Utilizing this property, a voltage is applied across the electrodes to carry a current through the glass to heat the glass itself (referred to as direct energizing). This direct energizing power is increased gradually and thereby all the cullet fed to the melting tank is put in the molten state. When the cullet is put in this state, the temperature of the glass can be kept without heating by means of the resistance heater, and therefore the heating by the resistance heater is stopped. Then, power adjustment is performed to keep the temperature at a value suitable for melting material by means of direct energizing. Simultaneously, a current is carried between the auxiliary electrode 4 and the main electrode 3a or 3b to adjust the temperature of the glass at the upper part of the freeze valve 6. On completing this adjustment, the high-radioactive waste and the glass material are fed through the material feed nozzle 7.

When the feeding of the material is continued until the glass level becomes suitable for pouring into the canister (a high glass level 8 in FIG. 1 is equivalent to this level), the freeze valve 6 is heated and the glass is poured into the canister. When a predetermined amount of glass is poured into the canister, heating of the freeze valve 6 is stopped. Then, the temperature of the glass passing through the freeze valve falls, and finally the glass is solidified and the flow-down stops. In the case of emergency, the flow is stopped sometimes by blowing air, water or the like to the freeze valve. When the pouring of the glass is completed, the glass level of the melting tank falls to a low glass level 9.

Thereafter, when the glass level reaches again to the high glass level 8 by feeding the material, flow-down of the glass is performed.

As in the case with this embodiment, when pouring into the canister is carried out by the freeze valve 6 for removing the platinum-group elements, the platinum-group elements are to be removed on a pour basis.

In the other pouring systems, for example, in the case where the freeze valve is installed at a place other than the furnace bottom of the melter, or in the case where the overflow system is adopted, it is required to remove the platinum-group elements from the bottom of the furnace using the freeze valve 6 in response to the state of the melter as described above. In either case, electric difficulties due to the platinum-group elements can be prevented and thereby operation of the melter can be carried out without trouble.

Also, a system may be adopted wherein the furnace-bottom accumulation is sucked up from above by an appropriate means in place of the freeze valve 6.

Hereinafter, description is made on the results of additional tests of the present invention attempted by the applicant.

In principle, concentration of a current on a good conductive layer can be prevented by taking the distance between this layer and the electrodes at large value even when this layer exists on the bottom of the furnace. Based on this consideration, an arrangement of electrodes required for preventing the concentration of the current on the bottom of the furnace was obtained employing a numeric model and a physical model-hereinafter referred to as R & D by means of models.

As to the fluidity of the furnace-bottom accumulation, because of the substance wherein the platinum-group elements are mixed in a glass matrix as described above, it is difficult to evaluate the viscosity thereof by the normal high-temperature viscosity measuring apparatus or the like. Therefore, a guideline was established wherein the freeze valve for drawing out the accumulation is installed at the bottom of the furnace, and the refractory surround this freeze valve is inclined to move the accumulation toward the freeze valve, and thereby the accumulation is removed combined with drawing-out of the glass, and based on this guideline, a melter scaled down to a fourth of the actual furnace was fabricated and actually operated, and the fluidity was evaluated by obtaining a minimum magnitude of inclination required for the flow-hereinafter referred to as R & D on the fluidity.

Based on the results obtained from the R & D by means of models and the R & D on the fluidity finally a melter scaled down to a half of the actual furnace was fabricated and operated, and the reasonableness of the results of the both R & Ds was evaluated.

Figure 3:
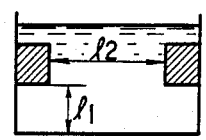
FIG. 3 is a schematic view showing an arrangement of electrodes of an electric melting furnace.

Employing the numeric model, the potential analysis was carried out on the arrangement of electrodes in FIG. 3 in the case where a good conductive layer exists on the bottom of the furnace with the distance $l_2$ between the electrodes kept constant and with the distance $l_1$ between the bottom ends of the electrodes and the bottom of the furnace taken as a parameter. Resultingly, in the melter by the conventional design with small $l_1$, a current concentrates strongly on the bottom of the furnace and a strongly heated part appears in the vicinity of the bottom ends of the electrodes. Then, it was made sure that with increasing $l_1$, the trend of concentration of the current on the bottom of the furnace is reduced, and by taking $l_1$ at more than a half of $l_2$, the concentration of the current is reduced. Also, an analysis of glass flow was carried out to study the temperature distributions in the cases where the good conductive layer is present and absent. Resultingly, in the case where a good conductive layer is absent, the upper part shows a high-temperature distribution, but in the case where a good conductive layer is present, high temperatures move to the bottom of the furnace, showing an abnormal temperature distribution. On the other hand, it was made sure that the melter wherein $l_1$ is more than a half of $l_2$ shows a good temperature distribution independent of presence or absence of the good conductive layer.

From the above-described, it can be said that by taking $l_1$ at more than a half of $l_2$, concentration of a current on the bottom of the furnace can be prevented independent of presence or absence of a good conductive layer. Subsequently, description is made on the results of the R & D on the fluidity of the furnace-bottom accumulation. First, a melter scaled down to a fourth of the actual furnace having an inclination of furnace bottom of 30° (hereinafter referred to as super-miniature type melter) was fabricated, and the fluidity of the accumulation on this inclination was evaluated. Glass cullet containing the platinum-group elements was fed to the super-miniature type melter, glass was made to flow down through the freeze valve attached to the bottom of the furnace, and these operations were repeated, and then the concentrations of the platinum-group elements contained in the glass flowing down were studied. Also, after completing the test, the temperature of the furnace was reduced in the glass-held state, and then the melter was cut and the state of each part was observed. As a result, it was found that the preparation of the concentration of the platinum-group elements contained in the glass flowing down to the concentration of the platinum-group elements in the fed glass cullet is about 10–20%, and the platinum-group elements accumulate in the furnace at every repetition of feed and flow-down. During the test, the temperature distribution in the direction of depth of the melting tank was measured regularly, and the results of this measurement also showed that the temperature at the vicinity of the bottom of the furnace rose gradually at every repetition of feed and flow-down and finally the temperature of the bottom of the furnace reached about more than 1300° C., while normally the part of glass reaching a highest temperature is the vicinity of the electrode level and the temperature thereof is about 1200° C. This shows that the platinum-group elements accumulated gradually in the furnace. Also, the results of observation by means of cutting the melter after the test surely showed that the furnace-bottom accumulation accumulated thickly on the bottom of the furnace and did not flow smoothly on the inclination of 30°.

Next, a super-miniature type melter having an inclination of furnace bottom of 45° was fabricated and a similar test was conducted. Resultingly, an analysis of the platinum-group elements in the glass flowing down found that the proportion of the concentration of the platinum-group elements contained in the glass flowing down to the concentration of the platinum-group elements contained in the fed glass cullet was 70-80%, and it is considered that almost all of the platinum-group elements could be removed when the amount voltatilized during melting is added. Also, the arrangement of electrodes of this super-miniature type melter was determined based on the results of the R & D by means of models, and it is considered that despite that feed of glass cullet and flow-down were repeated, the temperature distribution in the direction of depth of glass in the melting tank was not changed from the initial one, and the state of accumulation of the platinum-group elements in the furnace did not progress.

That is to say, it is considered that the platinum-group elements flowed on the inclination of 45° toward the freeze valve without accumulating in the furnace, and flowed outside the furnace every time the glass flowed down.

Actually, the results of observation by means of cutting the melter after the test surely showed that only a think accumulation layer was present on the inclination of 45° and the accumulation flowed on the inclination of 45° without stagnation.

Based on the above-described results of the R & D by means of models and the R & D on the fluidity, a design of a melter scaled down to a half of the actual furnace (hereinafter referred to as miniature type melter) was performed. This miniature type melter, likewise the super-miniature type melter, has the freeze valve for drawing out accumulation at the center of the furnace bottom, and the refractory surrounding the freeze valve has an inclination of 45° in the direction orthogonal to the direction of current flow across the electrodes and an inclination of 57.5° in the direction of current flow respectively toward the freeze valve. Also, the vertical distance between the bottom of the furnace and the bottom ends of the electrodes is set somewhat larger than a half of the distance between the electrodes supposing that some extent of accumulation will be developed on the bottom of the furnace.

A test was conducted using this miniature type melter by the same procedure as in the case of the above-mentioned super-miniature type melter. Resultingly, it was made sure that repetition of melting of glass cullet containing the platinum-group elements and the flow-down thereof through the freeze valve did not change the temperature distribution in the direction of depth of glass in the melting tank and the resistance between the electrodes, and the concentration of the current on the bottom of the furnace could be prevented. Also, it was made sure again that the glass flowing down contained a high concentration of platinum-group elements and the furnace-bottom accumulation flowed on the inclinations of 45° and 57.7° without stagnation. The same could be made sure also from the results of the observation by means of cutting the melter after the test.

We claim:

1. An electric melting furnace for glassifying high-radioactive waste comprising: a melting tank for melting glass material to form molten glass containing platinum-group elements derived from said high-radioactive waste, at least a pair of spaced electrodes for supplying electric current through said molten glass in said melting tank to maintain the temperature of said molten glass at a value suitable for melting said glass material, and a furnace bottom for discharging said molten glass, said furnace bottom having a glass outlet surrounded by an inclined sidewall having an inclination of more than 30° and not more than 70° with respect to the horizontal plane of the glass outlet, and the distance between said glass outlet at said furnace bottom and the bottom ends of said pair of electrodes being at least one-half of the distance between said spaced electrodes whereby said electrodes will be spaced from said glass outlet to prevent a concentration of electric current at said furnace bottom and said inclined sidewall will enhance the flow of said platinum-group elements in molten glass removed from said furnace bottom.

2. An electric melting furnace in accordance with claim 1, wherein said inclination of said furnace bottom sidewall is more than 40° and not more than 60°.

3. An electric melting furnace in accordance with claim 1 or claim 2, wherein the distance between said glass outlet and the bottom ends of said pair of electrodes is not greater than the distance between said spaced electrodes.

4. An electric melting furnace for glassifying high-radioactive waste comprising: a melting tank for melting glass material to form molten glass containing platinum-group elements derived from said high-radioactive waste, at least a pair of spaced electrodes for supplying electric current through said molten glass in said melting tank to maintain the temperature of said molten glass at a value suitable for melting said glass material, and a furnace bottom for discharging said molten glass, said furnace bottom having a glass outlet surrounded by an inclined sidewall having an inclination of more than 30° and not more than 70° with respect to the horizontal plane of the glase outlet, and the distance between said glass outlet at said furnace bottom and the bottom ends of said pair of electrodes being at least one-half of the distance between said spaced electrodes but not greater than the distance between said spaced electrodes whereby said electrodes will be spaced from said glass outlet to prevent a concentration of electric current at said furnace bottom and said inclined sidewall will enhance the flow of said platinum-group elements in molten glass removed from said furnace bottom.

5. An electric melting furnace in accordance with claim 4, wherein said inclination of said furnace bottom sidewall is more than 40° and not more than 60°.

6. A method of glassifying high-radioactive waste comprising the steps of: providing an electric melting furnace which has a melting tank for melting glass material to form molten glass, at least a pair of spaced electrodes for supplying electric current through said molten glass in said melting tank to maintain the temperature of said molten glass at a value suitable for melting said glass material and a furnace bottom for discharging said molten glass, said furnace bottom having a glass outlet surrounded by an inclined sidewall having an inclination of between 30° and 70° with respect to the horizontal plane of the glass outlet, positioning said spaced electrodes in said melting tank at a location with the vertical distance between the bottom of said electrodes and said glass outlet between one-half and one times the horizontal distance between said spaced electrodes, providing glass cullet in said melting tank, heating said cullet to form molten glass with electric current supplied between said spaced pair of electrodes, adding high-radioactive waste containing platinum-group elements to said molten glass, and drawing molten glass containing said platinum group elements through said glass outlet into a canister with said inclined sidewall enhancing the flow of said platinum-group elements in molten glass drawn through said furnace bottom glass outlet and said electrodes being spaced from said glass outlet to prevent a concentration of electric current at said furnace bottom.

* * * * *